Dec. 16, 1941.  A. C. SCINTA  2,266,385
WINDSHIELD WIPER MOUNTING
Filed July 13, 1939
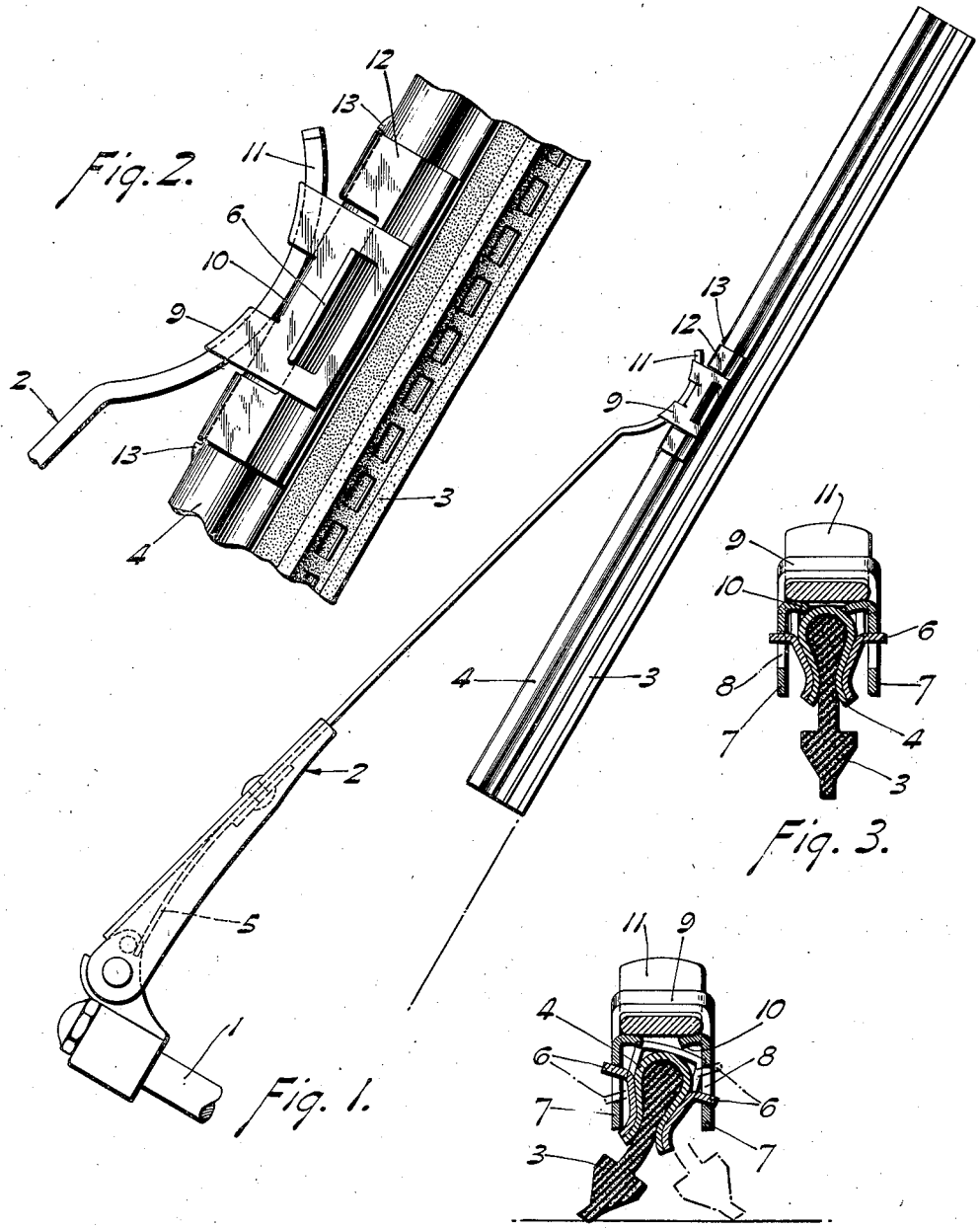
INVENTOR
Anthony C. Scinta
BY
Beau, Brooks Buckley & Beau.
ATTORNEYS Patented Dec. 16, 1941

2,266,385

UNITED STATES PATENT OFFICE 2,266,385

WINDSHIELD WIPER MOUNTING

Anthony C. Scinta, Buffalo, N. Y., assignor to Trico Products Corporation, Buffalo, N. Y.

Application July 13, 1939, Serial No. 284,287

7 Claims. (Cl. 15—250)

This invention relates to a windshield cleaner and more particularly to the attachment of the wiper to its actuating arm.

The desirability of having the wiper tilt to a dragging position at the beginning of each stroke is well known in the windshield cleaner art. More recently it has been proposed to embody in the wiper mounting some resilient means tending to normalize the wiper when inoperative.

The present invention has for its object to simplify the construction and yet accomplish the desired performance in a more efficient manner. More particularly, the invention embodies a construction by which the normalizing effort is increased and at the same time the attachment is compacted so that the parts will sit low or close to the windshield surface to reduce the wind resistance.

In the accompanying drawing

Fig. 1 is a fragmentary side elevation of a windshield cleaner constructed in accordance with the present invention.

Fig. 2 is a similar view on an enlarged scale showing more clearly the attachment; and Figs. 3 and 4 are transverse sectional views through the attachment.

Referring more particularly to the drawing, the numeral 1 designates the shaft of a windshield cleaner, 2 the wiper arm fixed thereon, and 3 the wiper or blade having a channeled reinforcement 4. The arm embodies a leaf spring 5 serving to press the wiper against the windshield at the desired wiping pressure.

The attachment comprises a pair of lugs 6, extending in opposite directions from the sides of the channeled backing 4, and a pair of ears 7 carried by the arm 2 and freely straddling the back of the wiper with the ears being apertured to receive the laterally extending lugs. The ear apertures 8 are of sufficient size to permit the wiper to rock back and forth between the ears, as depicted in Fig. 4. The upper edges of the openings 8 normally rest on the lugs under the pressure of spring 5 and serve to resiliently urge the wiper to such normal position when rocked therefrom. From Fig. 4 it will be observed that during the rocking action the lugs alternately fulcrum on such upper edges and are limited in their rocking by engagement with the lower edges of the ear openings. It will further be noted that the lugs extend from the sides of the wiping blade, in a plane beneath the upper or back edge thereof, so that the points on which the resiliently urged arm bears or exerts downward pressure on the wiper are well below the back of the wiper and laterally spaced therefrom whereby a lever advantage is obtained to enhance the normalizing effect.

Preferably, the ears are permanently connected to the lugs and, therefore, carried by the wiper. According to the illustrated embodiment the ears form the sides or legs of an inverted U-shaped saddle which has its back spaced at points from the wiper to form straps 9 which slidably receive the free end of the arm. The sides of the saddle between the straps 9 are pressed inwardly to form ledges 10 which may be slightly resilient or otherwise formed so as to provide for a firm hold on the arm when the latter is inserted within the pocket as defined in the back of the saddle by the ledges. The width of the arm terminal is substantially equal to the inner dimension of the pocket which latter may be shaped about a transverse axis to receive the like curved terminal 11 of the arm. This permits of proper adjustment of the wiper on the windshield as well as provides added assurance against accidental displacement of the wiper. In this connection it will be noted that the lugs are elongated lengthwise of the wiper so that the latter may play freely between the ears and about a substantially transverse axis. Furthermore, with respect to the lateral rocking about the longitudinal axis, the maximum degree of such rocking movement is obtained only when the saddle is perpendicular to the glass surface in which position the lugs 6 are fully engageable with the upper and lower edges of the slots 8. Consequently, should the position of the saddle be disturbed so as to be out of normal to the glass surface it will be restored to such perpendicular relation when in use because when the saddle is out of normal the lugs 6 will be tilted or inclined relative to the upper edges of the slots and bear thereon at one end or the other with the result that as the blade rocks during operation the tilted lugs will alternately engage the upper and lower edges of the slots 8 with a camming action which under the repeated engagements will gradually jar the saddle back into normal relation to the wiper.

The ears may be formed separate from the wiper, as illustrated, by striking them from the blank when shaping the clip 12. This clip is conformable in shape to that of the channeled backing and is slipped or sprung thereover with an interlocking fit. It may be secured in position by interengagement with and between a pair of nibs 13 pressed from the back of the channeled member. These nibs are beveled on their remote sides to guide the clip to position when it is slid over the end of the blade to its intermediate position.

In this connection it will be noted that when the clip is slipped over the end of the blade and slid along the back of the holder or reinforcing member 4, the beveled approach provided by the adjacent nib 13 will serve to cam the back of the clip off the back of the holder so as to readily permit the sliding of the clip to its operative position where it is confined by the nibs. This camming action takes place against the resiliency of the sides of the strip of the clip which conformably hug the downwardly converging sides of the channeled holder, as shown in Fig. 3. Consequently, when the clip is caused to ride over a nib it will be against the resiliency of the sides of the clip, and after the clip has passed over the particular nib the sides of the clip will act on the converging sides of the holder to again restore the back of the clip fully seated on the back of the blade.

The foregoing description is illustrative of the inventive principles involved herein, which may take on other physical embodiments without departing from the spirit or scope of the invention claimed.

What is claimed is:

1. In a windshield cleaner having a wiper member with means for mounting the same on an actuating arm having an arcuate terminal portion, said means comprising a saddle member having a part adapted to embrace the terminal portion for sliding movement about the axis thereof, one of said members having spaced ears freely straddling the other member, each ear having an opening elongated lengthwise of the wiper, and oppositely disposed fulcrum members on the other member loosely engaged in the ear openings for rocking of the wiper about longitudinal and transverse axes, said fulcrum members being elongated lengthwise of the wiper and in normal position conformably engaging one of the longitudinal edges of the respective openings during lateral rocking motion of the wiper for the maximum extent of rocking motion, said fulcrum members adapted when displaced from full facial engagement with said one of the longitudinal edges to act with a camming effect thereon by and during such lateral rocking motion to restore the saddle to its normal position for securing such maximum extent.

2. In a windshield cleaner having a wiper, an actuating arm for resiliently urging the wiper toward the windshield, said arm having an arcuate terminal portion, a saddle member embracing the terminal portion for sliding movement about the axis thereof and having spaced ears freely straddling the wiper, each ear having an opening elongated lengthwise of the wiper, and oppositely disposed fulcrum members on the wiper loosely engaged in the ear openings for rocking of the wiper about longitudinal and transverse axes, said fulcrum members being elongated lengthwise of the wiper and in normal position conformably engaging the upper and lower edges of the openings during lateral rocking motion of the wiper between the ears for the maximum extent of rocking motion, said fulcrum members adapted when displaced from full facial engagement with the upper and lower edges to act with a camming effect on said upper and lower edges by and during such lateral rocking motion to restore the saddle to its normal position for securing such maximum extent.

3. In a windshield cleaner having a wiper, an actuating arm for resiliently urging the wiper toward the windshield, said arm having an arcuate terminal portion, a saddle member embracing the terminal portion for sliding movement about the axis thereof and having spaced bearing portions engaging the terminal portion, means resiliently maintaining the saddle engaged with the terminal portion while permitting sliding movement of the saddle about the axis of the terminal, and a play connection between the saddle and the wiper, said connection including a pair of laterally extending fulcrum members elongated lengthwise of the wiper and freely engaging in elongated openings in the saddle member to limit the rocking of the wiper about a transverse axis while permitting the wiper to rock laterally by said fulcrum members pivoting on the edges of the elongated openings.

4. A wiper having a channeled reinforcing holder with side wall portions converging toward the wiping edge, a spring clip having side walls resiliently embracing the side wall portions and coacting therewith to urge the back of the clip down against the back of the holder, and means interlocking the clip to the holder, said interlocking means including a longitudinally extending cam surface over which the back of the clip rides against the resilient urge of the clip side walls during positioning movement of the clip lengthwise on the holder, said resilient side walls yielding to permit such riding of the back wall of the clip and thereafter acting to restore the clip to maintain the interlock.

5. A wiper having a wiping element and a resilient channeled holder with side wall portions converging toward the wiping edge for frictionally maintaining the wiping element between said walls, a spring clip having side walls resiliently embracing the side wall portions intermediate the ends thereof and coacting therewith to urge the back of the clip into seating engagement with the holder, and locating means arranged to confine the clip to its embracing position, said locating means having a cam surface to pass the clip to its operative position during sliding placement thereof along the holder.

6. In a windshield cleaner having a wiper, an actuating arm for resiliently urging the wiper toward the windshield, said arm having an arcuate terminal portion, a saddle member embracing the terminal portion for sliding movement about the axis thereof and having spaced ears freely straddling the wiper, each ear having an opening elongated lengthwise of the wiper, and oppositely disposed fulcrum members on the wiper engaged in the ear openings, said fulcrum members being elongated lengthwise of the wiper and adapted to conformably engage the upper and lower edges of the openings by and during rocking motion of the wiper between the ears for urging the saddle member into a position on the arcuate terminal portion wherein the maximum extent of rocking motion is secured.

7. A wiper having a channeled reinforcing holder with side wall portions converging toward the wiping edge, a spring clip having side walls resiliently embracing the side wall portions and coacting therewith to urge the back of the clip down against the back of the holder, and means interlocking the clip to the holder, said interlocking means comprising spaced lugs one on each side of the clip to confine the latter in its operative position on the holder, the remote side of one lug being in the form of an inclined approach up which the clip may move when sliding on the holder over the lug to its operative position.

ANTHONY C. SCINTA.